(12) United States Patent
Chang et al.

(10) Patent No.: US 9,226,067 B2
(45) Date of Patent: Dec. 29, 2015

(54) FAN ACTIVE NOISE SELF-LOWERING SYSTEM

(71) Applicant: ASIA VITAL COMPONENTS CO., LTD., New Taipei (TW)

(72) Inventors: Bor-Haw Chang, New Taipei (TW); Sung-Hsien Sun, New Taipei (TW); Sung-Wei Sun, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 78 days.

(21) Appl. No.: 14/250,362

(22) Filed: Apr. 10, 2014

(65) Prior Publication Data

US 2015/0296295 A1    Oct. 15, 2015

(51) Int. Cl.
*G10K 11/16* (2006.01)
*H04R 3/00* (2006.01)
*G10K 11/178* (2006.01)

(52) U.S. Cl.
CPC ............ *H04R 3/002* (2013.01); *G10K 11/1784* (2013.01); *G10K 11/1788* (2013.01)

(58) Field of Classification Search
None
See application file for complete search history.

(56) References Cited

U.S. PATENT DOCUMENTS

| | | | |
|---|---|---|---|
| 2010/0028134 A1* | 2/2010 | Slapak et al. | G10K 11/178 381/71.3 |
| 2012/0210741 A1* | 8/2012 | Fujiwara | G10K 11/1786 381/71.3 |
| 2014/0180484 A1* | 6/2014 | Wang | F16F 15/00 700/280 |

* cited by examiner

*Primary Examiner* — Muhammad N Edun

(57) ABSTRACT

A fan active noise self-lowering system includes a fan, a push assembly, at least one pickup unit and a digital signal processing unit. The pickup unit serves to capture the noise made by the fan to generate a noise input signal and transmit the noise input signal to the digital signal processing unit. The digital signal processing unit receives the noise input signal and processes the noise input signal to output a control signal for controlling the push winding assembly to operate so as to push the fan impeller of the fan to move up and down. Accordingly, the fan impeller will generate a reverse sonic wave to offset the noise.

16 Claims, 14 Drawing Sheets

FAN ACTIVE NOISE SELF-LOWERING SYSTEM

BACKGROUND OF THE INVENTION

1. Field of the Invention

The present invention relates generally to a fan system, and more particularly to a fan active noise self-lowering system, which can actively lower the noise through the fan itself and is manufactured at lower cost.

2. Description of the Related Art

Nowadays, computers have become daily used electronic devices. Most of the computers process a lot of data everyday. When processing these data, the central processing unit (CPU) in the computer will inevitably generate high heat. The high heat must be dissipated in time. Otherwise, the operation of the central processing unit will become unstable and the computer is likely to malfunction or even crash. In some more serious cases, the internal electronic components of the computer may burn down. In general, a cooling fan is used to forcedly dissipate the heat of the electronic components of the computer, (such as the central processing unit, graphic chip, Southbridge chip and Northbridge chip) so as to stabilize the operation of the computer. The cooling fan solves the heat dissipation problem of the computer. However, the fan leads to another problem. That is, in operation, the fan will make troublesome noise.

The manufacturers have more and more stressed the noise problem. This is because the noise made by the fan will cause anxiety of a user to different extents and increase tiredness of the user. As a result, the working efficiency of the user will be deteriorated. In some more serious cases, the user may be mentally and physiologically hurt. Therefore, it is academically meaningful to effectively eliminate the noise. Also, it is industrially practical to eliminate the noise so as to improve the daily life of people. In general, the conventional fan active noise control is achieved by one or more pickup microphones for capturing the noise made by the fan and generating a noise input signal to a digital signal processor (DSP). The digital signal processor receives the noise input signal and processes the noise input signal to output a control signal to one or more loud speakers for driving the speakers to emit reverse sonic wave (or so-called reverse sound source) to offset the noise.

The conventional fan active noise control can offset the noise made by the fan. However, another problem exists in the conventional device. That is, the reverse sonic wave emitted from the speakers will reflect in the environmental space to overlap the environmental noise. Therefore, the pickup microphone not only will capture the noise of the fan, but also will capture the reflective sonic wave. As a result, the noise input signal received by the digital signal processor contains the noise of the fan as well as the overlapping environmental noise and reflective sonic wave. Therefore, the operation of the digital signal processor is complicated and it is hard for the digital signal processor to generate an effective reverse sonic wave for offsetting the noise of the fan and the overlapping environmental noise and reflective sonic wave. Accordingly, the noise-lowering effect is poor and the cost for the equipment is quite high. Therefore, the conventional fan active noise control can only offset the noise made in a position where the pickup microphone is positioned.

According to the above, the conventional device has the following shortcomings:
1. The noise-lowering effect is poor.
2. The cost for the equipment is quite high.

SUMMARY OF THE INVENTION

It is therefore a primary object of the present invention to provide a fan active noise self-lowering system, which has better noise-lowering effect.

It is a further object of the present invention to provide the above fan active noise self-lowering system, which is manufactured at lower cost.

To achieve the above and other objects, the fan active noise self-lowering system of the present invention includes a fan, a push assembly, at least one pickup unit and a digital signal processing unit. The fan includes a frame body, a bearing cup and a fan impeller. The fan impeller has a magnetic shaft and multiple blades. One end of the magnetic shaft is affixed to a center of the fan impeller. The frame body has a receiving space. The bearing cup is disposed at a center of the receiving space. The bearing cup has bearing hole. At least one bearing is disposed in the bearing hole and rotatably connected with the other end of the magnetic shaft. The push assembly includes a push winding assembly received in the bearing hole in adjacency to the bearing for inductive magnetization with the magnetic shaft so as to push the magnetic shaft to axially move up and down, whereby the fan impeller generates a reverse sonic wave to offset the noise made by the fan. The pickup unit is disposed on the frame body. The pickup unit serves to capture the noise made by the fan to generate a noise input signal. One end of the digital signal processing unit is electrically connected to the pickup unit, while the other end of the digital signal processing unit is electrically connected to the push winding assembly. The digital signal processing unit receives and processes the noise input signal to output a control signal for controlling the push winding assembly to operate.

Alternatively, the fan active noise self-lowering system of the present invention includes a fan, a push assembly, at least one pickup unit and a digital signal processing unit. The fan includes a frame body, a bearing cup and a fan impeller. The fan impeller has a shaft and multiple blades. One end of the shaft is affixed to a center of the fan impeller. The frame body has a receiving space. The bearing cup is disposed at a center of the receiving space. The bearing cup has a bearing hole. At least one bearing is disposed in the bearing hole and rotatably connected with the other end of the shaft. The push assembly includes a housing, a push winding assembly and a magnetic member. The housing is mated with a bottom section of the bearing cup and formed with a receiving space in communication with the bearing hole. The push winding assembly and the magnetic member are received in the receiving space. One end of the magnetic member is connected to the other end of the shaft for inductive magnetization with the push winding assembly so as to push the shaft to axially move up and down, whereby the fan impeller generates a reverse sonic wave to offset the noise made by the fan. The pickup unit is disposed on the frame body. The pickup unit serves to capture the noise made by the fan to generate a noise input signal and transmit the noise input signal to the digital signal processing unit. One end of the digital signal processing unit is electrically connected to the pickup unit, while the other end of the digital signal processing unit is electrically connected to the push winding assembly. The digital signal processing unit receives and processes the noise input signal to output a control signal for controlling the push winding assembly to operate.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
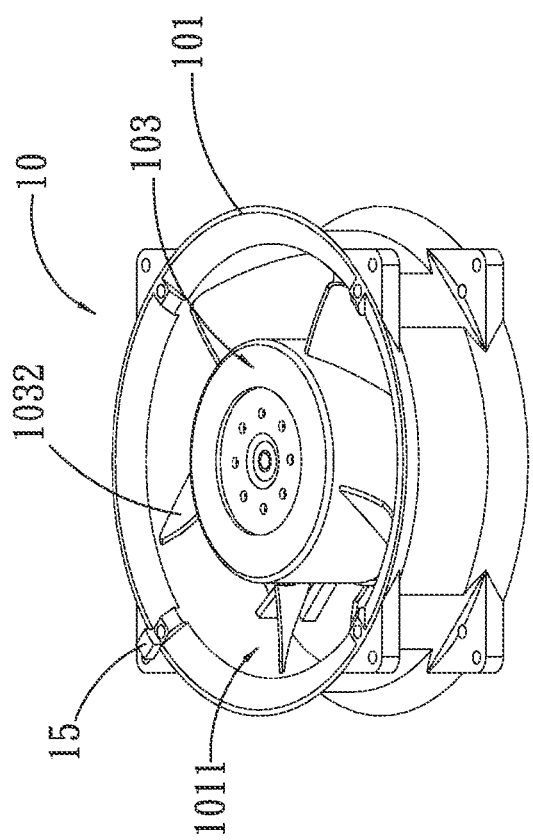
FIG. 1 is a perspective assembled view of a first embodiment of the present invention.

The embodiments of the present invention will be described hereinafter with reference to the drawings, wherein the same components are denoted with the same reference numerals.

Figure 2:
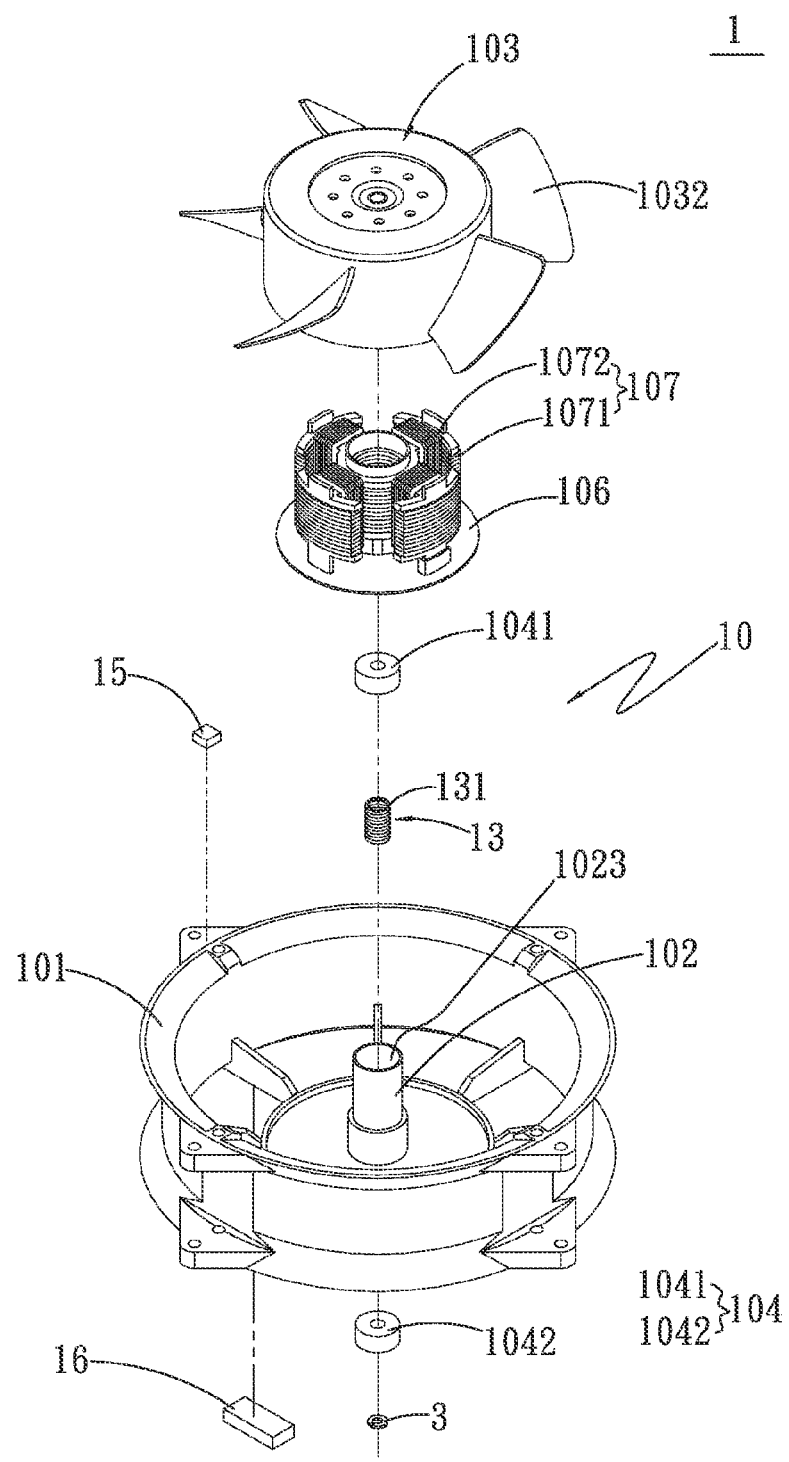
FIG. 2 is a perspective exploded view of the first embodiment of the present invention.
Figure 3:
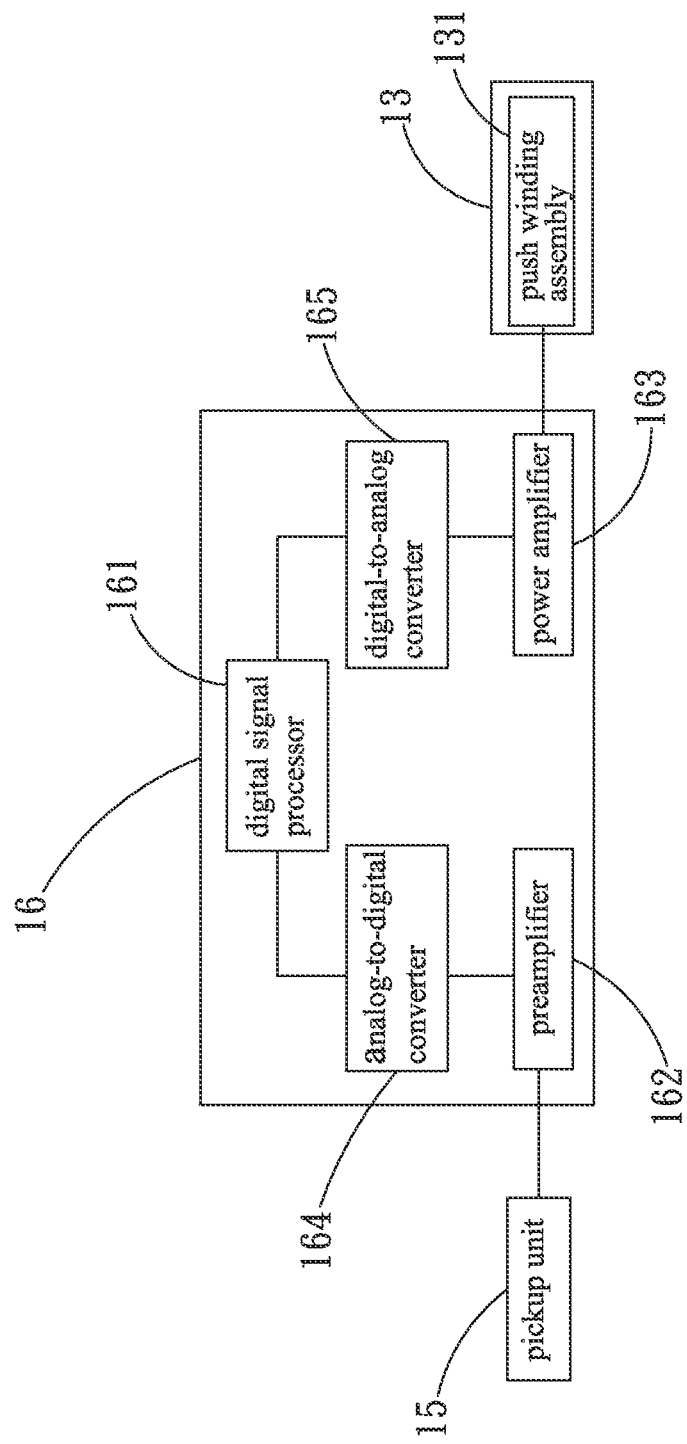
FIG. 3 is a block diagram of the first embodiment of the present invention.
Figure 4A:
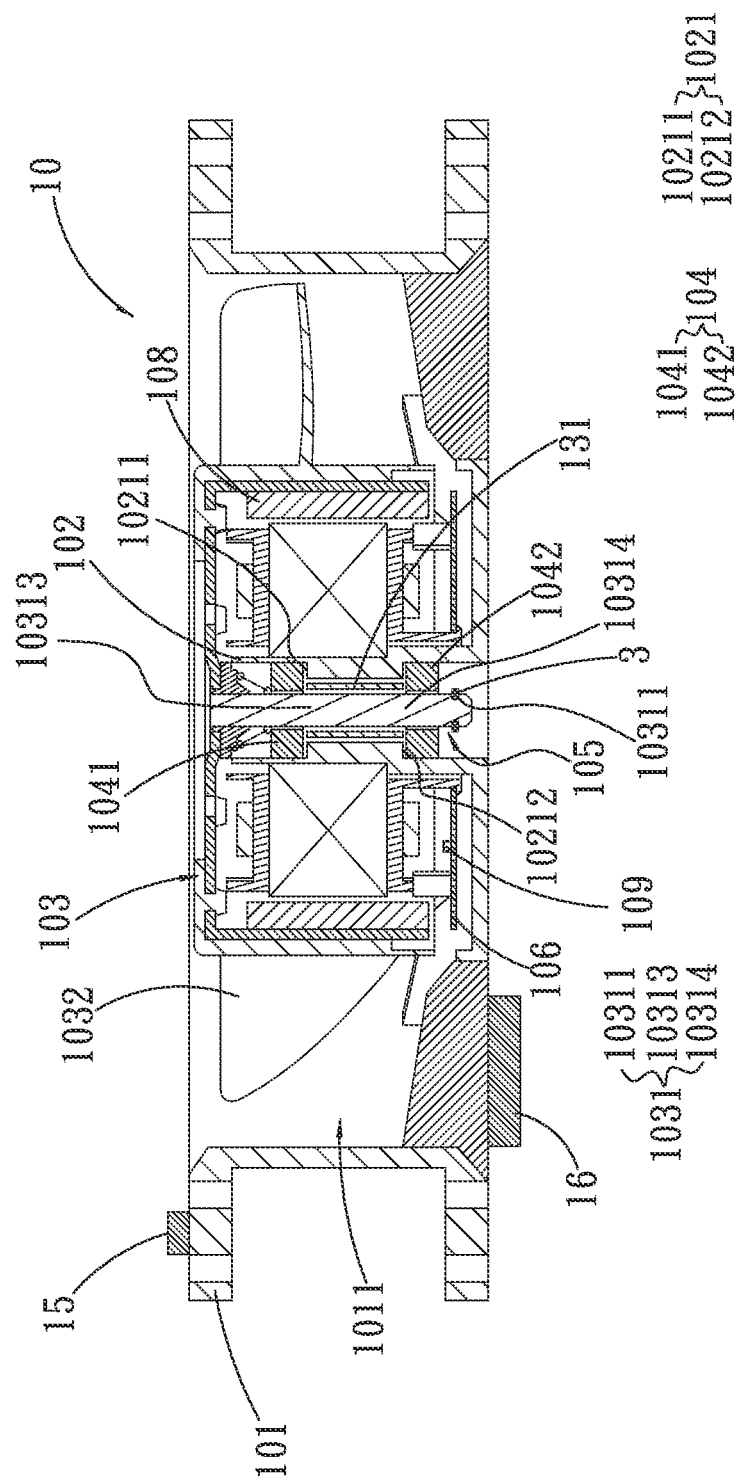
FIG. 4A is a sectional assembled view of the first embodiment of the present invention.

Please refer to FIGS. 1, 2 and 3 as well as FIG. 4A. FIG. 1 is a perspective assembled view of a first embodiment of the present invention. FIG. 2 is a perspective exploded view of the first embodiment of the present invention. FIG. 3 is a block diagram of the first embodiment of the present invention. FIG. 4A is a sectional assembled view of the first embodiment of the present invention. According to the first embodiment, the fan active noise self-lowering system 1 of the present invention includes a fan 10, a push assembly 13, at least one pickup unit 15 and a digital signal processing unit 16. The fan 10 includes a frame body 101, a bearing cup 102, a fan impeller 103 and a stator 107. The stator 107 is fitted around the bearing cup 102 corresponding to a magnet 108 disposed in the fan impeller 103. The stator 107 has a silicon steel sheet assembly 1071 and a winding assembly 1072 wound on the silicon steel sheet assembly 1071.

The fan impeller 103 has a magnetic shaft 1031 and multiple blades 1032. One end of the magnetic shaft 1031 is affixed to a center of the fan impeller 103. The outer circumference of the other end of the magnetic shaft 1031 is formed with a groove 10311 in which a retainer member 3 (such as a C-shaped retainer ring) is secured to hold the magnetic shaft 1031. The frame body 101 has a receiving space 1011. The bearing cup 102 is disposed at a center of the receiving space 1011. The bearing cup 102 has a bearing hole 1023 in communication with the receiving space 1011 and a support section 1021. The support section 1021 protrudes from an inner wall face of the bearing cup 102 toward the center of the bearing hole 1023. The support section 1021 has a first platform 10211 and a second platform 10212. The first platform 10211 is formed at a top section of the support section 1021, while the second platform 10212 is formed at a bottom section of the support section 1021.

At least one bearing 104 is disposed in the bearing hole 1023 and rotatably connected with the other end of the magnetic shaft 1031. In this embodiment, there are two bearings 104 for illustration. That is, there are a first bearing 1041 and a second bearing 1042. The first bearing 1041 is positioned on the first platform 10211, while the second bearing 1042 is positioned on the second platform 10212 above the groove 10311 of the magnetic shaft 1031. In other words, the groove 10311 is positioned below the second bearing 1042. A move space 105 is defined between the groove 10311 and the second bearing 1042 for the magnetic shaft 1031 to axially move up and down.

Please further refer to FIGS. 2, 3 and 4A. The push assembly 13 includes a push winding assembly 131 received in the bearing hole 1023 in adjacency to the bearings 104 for inductive magnetization with the magnetic shaft 1031. That is, the push winding assembly 131 is positioned between the first and second bearings 1041, 1042 in the bearing hole 1023 corresponding to a first magnetic pole 10313 and a second magnetic pole 10314 of the magnetic shaft 1031. In this embodiment, the first and second magnetic poles 10313, 10314 respectively are, but not limited to, N pole and S pole for illustration. In practice, the first and second magnetic poles 10313, 10314 can be S pole and N pole respectively.

Figure 4B:
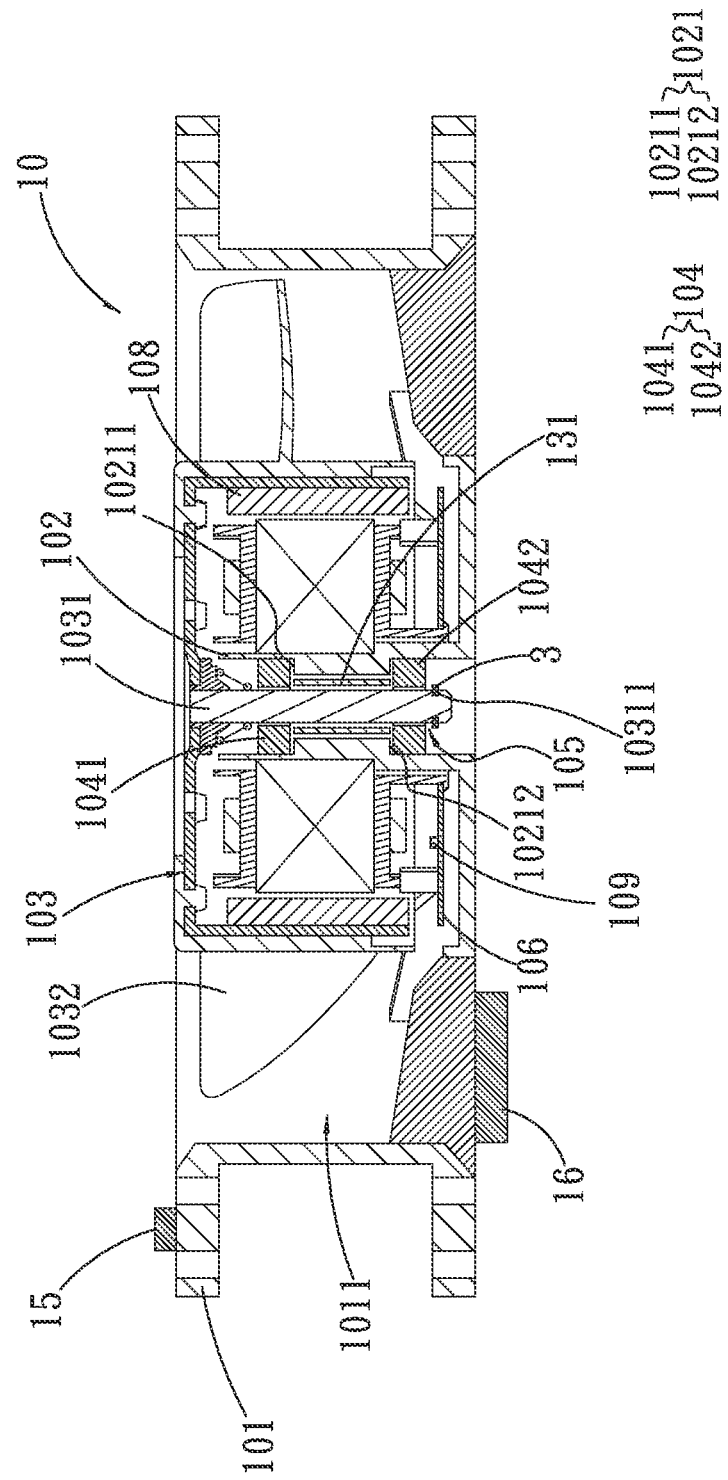
FIG. 4B is another sectional assembled view of the first embodiment of the present invention.
Figure 4C:
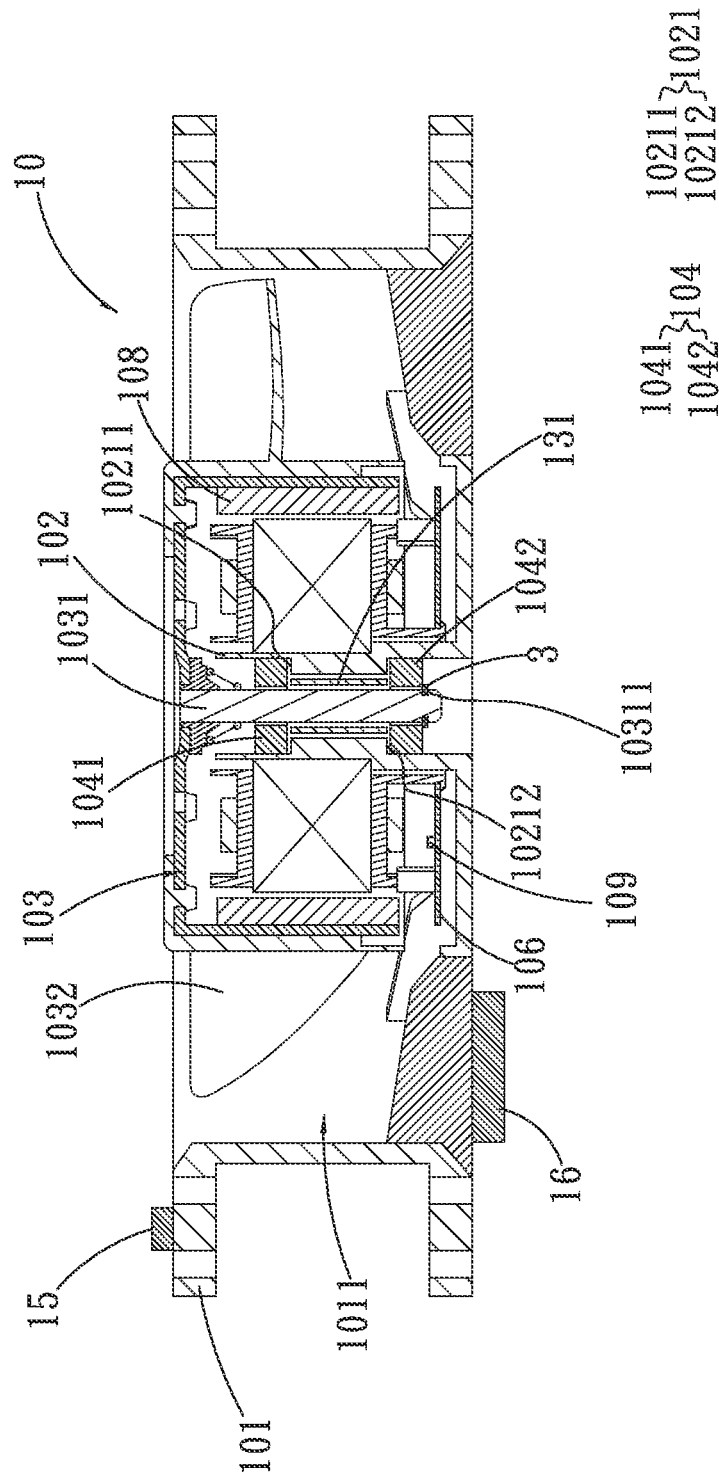
FIG. 4C is still another sectional assembled view of the first embodiment of the present invention.

When the push winding assembly 131 is powered on, the push winding assembly 131 creates a magnetic field to repel the first and second magnetic poles, (that is, N pole and S pole) of the magnetic shaft 1031 under magnetic force. Accordingly, the magnetic shaft 1031 in operation will be pushed to axially move up and down within the move space 105 (with reference to FIGS. 4A, 4B and 4C). Therefore, when the fan impeller 103 operates to provide air volume, a reverse sonic wave is also generated. The reverse sonic wave has an amplitude equal to the amplitude of the noise made by the fan 10, but has a phase reverse to the phase of the noise. The reverse sonic wave serves to interfere with or offset the operation noise of the fan impeller 103. In this embodiment, the first magnetic pole 10313 (N pole) of the magnetic shaft 1031 is positioned in adjacency to one end of the push winding assembly 131, while the second magnetic pole 10314 (S pole) is positioned in adjacency to the other end of the push winding assembly 131. In practice, alternatively, the second magnetic pole 10314 of the magnetic shaft 1031 can be positioned at one end of the magnetic shaft 1031 in adjacency to the push winding assembly 131, while the first magnetic pole 10313 can be positioned at the other end of the magnetic shaft 1031 in adjacency to the push winding assembly 131.

According to the above, the fan 10 of the present invention itself is a sound source. When the fan impeller 103 makes noise, the fan 10 itself will immediately generate a reverse sonic wave to effectively interfere with or offset the noise. In this case, the noise of the fan 10 is prevented from reflecting in the environmental space to form a complex noise. Therefore, the amplitude of the noise is previously greatly reduced to restrain the noise from spreading. Under such circumstance, the signal source, (that is, the noise source) received by the digital signal processing unit 16 is relatively simple so that the complication of operation of the digital signal processing unit 16 is lowered. Therefore, the price can be lowered.

The pickup unit 15 is a pickup microphone disposed on the frame body 101 in adjacency to the fan impeller 103. In this embodiment, the pickup microphone is fixedly disposed on a top face of the frame body 101 in adjacency to the fan impeller 103. The pickup unit 15 serves to capture (or read) the noise made by the fan impeller 103 in operation to generate a noise input signal and transmit the noise input signal to the digital signal processing unit 16. In this embodiment, the digital signal processing unit 16 is disposed under a bottom face of the frame body 101. The fan 10 further includes a controller 109 such as a microcontroller (MCU) for controlling the rotational speed and operation of the fan. The controller 109 is disposed on a circuit board 106. The circuit board 106 is disposed on one side of the bearing cup 102 in adjacency to the fan impeller 103 for illustration. That is, the digital signal processing unit 16 independently processes the noise signal to control the push assembly 13 to operate, while the controller 109 of the fan 10 independently controls the operation and rotational speed of the fan 10.

In practice, the digital signal processing unit 16 can be integrated with the controller 109 such as a microcontroller (MCU) of the fan 10 and arranged on the same circuit board 106. The digital signal processing unit 16 independently processes the noise signal to control the push assembly 13 to operate, while the controller 109 of the fan 10 independently controls the operation and rotational speed of the fan 10. Alternatively, the digital signal processing unit 16 can be directly arranged on the circuit board 106 on one side of the bearing cup 102 instead of the original controller 109 of the fan 10. (That is, the fan is free from the controller.) In this case, the digital signal processor (DSP) 161 of one single digital signal processing unit 16 can control the operation and rotational speed of the fan 10 and process the noise signal to control the push assembly 13 to operate.

Please now refer to FIGS. 3 and 4A. One end of the digital signal processing unit 16 is electrically connected to the pickup unit 15, while the other end of the digital signal processing unit 16 is electrically connected to the push winding assembly 131. The digital signal processing unit 16 receives and processes the noise input signal to output a control signal for controlling the push winding assembly 131 to operate. The powered on push winding assembly 131 receives the control signal to create a magnetic field. The digital signal processing unit 16 includes the digital signal processor (DSP) 161, a preamplifier 162, a power amplifier 163, an analog-to-digital converter (ADC) 164 and a digital-to-analog converter (DAC) 165.

The preamplifier 162 has an anti-noise characteristic. One end of the preamplifier 162 is electrically connected to the pickup unit 15, while the other end of the preamplifier 162 is electrically connected to the analog-to-digital converter (ADC) 164. The preamplifier 162 serves to amplify the noise input signal transmitted from the pickup unit 15 and then output an amplified noise input signal. The analog-to-digital converter (ADC) 164 serves to convert the received amplified noise input signal into a digital signal (amplified digital noise input signal).

The digital signal processor (DSP) 161 is electrically connected to the analog-to-digital converter (ADC) 164 and the digital-to-analog converter (DAC) 165. The digital signal processor (DSP) 161 receives the digital signal and processes the digital signal to output a reverse digital signal to the digital-to-analog converter (DAC) 165. The digital-to-analog converter (DAC) 165 receives the reverse digital signal and converts the reverse digital signal into a reverse analog signal. The power amplifier 163 is electrically connected to the digital-to-analog converter (DAC) 165 and the push winding assembly 131 of the push assembly 13. The power amplifier 163 serves to amplify the power of the received signal. That is, the power amplifier 163 amplifies the power of the received reverse analog signal to output the control signal (the amplified analog audio signal) for controlling the push winding assembly 131 to operate.

According to the above arrangement, when the fan 10 operates to make noise, the pickup unit 15 on the frame body 101 readily captures the noise made by the fan impeller 103 to generate the noise input signal and transmit the noise input signal to the preamplifier 162. The preamplifier 162 amplifies the received noise input signal and then outputs the amplified noise input signal to the analog-to-digital converter (ADC) 164. The analog-to-digital converter (ADC) 164 converts the amplified noise input signal into the digital signal. The digital signal processor (DSP) 161 receives the digital signal and processes the digital signal to output the reverse digital signal to the digital-to-analog converter (DAC) 165. The digital-to-analog converter (DAC) 165 converts the reverse digital signal into the reverse analog signal. The power amplifier 163 amplifies the power of the received reverse analog signal to output the control signal to the push winding assembly 131 for controlling and powering on the push winding assembly 131 to operate and create the magnetic field for inductive magnetization with the magnetic shaft 1031. Accordingly, the magnetic shaft 1031 of the fan impeller 103 in operation will be pushed to axially move up and down within the move space 105 (with reference to FIGS. 4A, 4B and 4C), whereby the fan impeller 103 will make or emit a reverse sonic wave with an amplitude equal to that of the noise made by the fan 10. However, the phase of the reverse sonic wave is reverse to the phase of the noise so that the reverse sonic wave can effectively interfere with or offset the noise made by the fan 10 in operation.

Therefore, the digital signal processing unit 16 of the present invention can be properly control the push assembly 13 to operate for inductive magnetization with the magnetic shaft 1031 so as to push the magnetic shaft 1031 of the fan impeller 103 to move up and down. In this case, the fan impeller 103 itself will emit a reverse sonic wave to offset (or interfere with) the noise made by the fan 10. According to such systematic design, a better noise-lowering effect is achieved and the cost is lowered. Moreover, the noise of the fan 10 is prevented from reflecting in the environmental space to form a complex noise.

Figure 5:
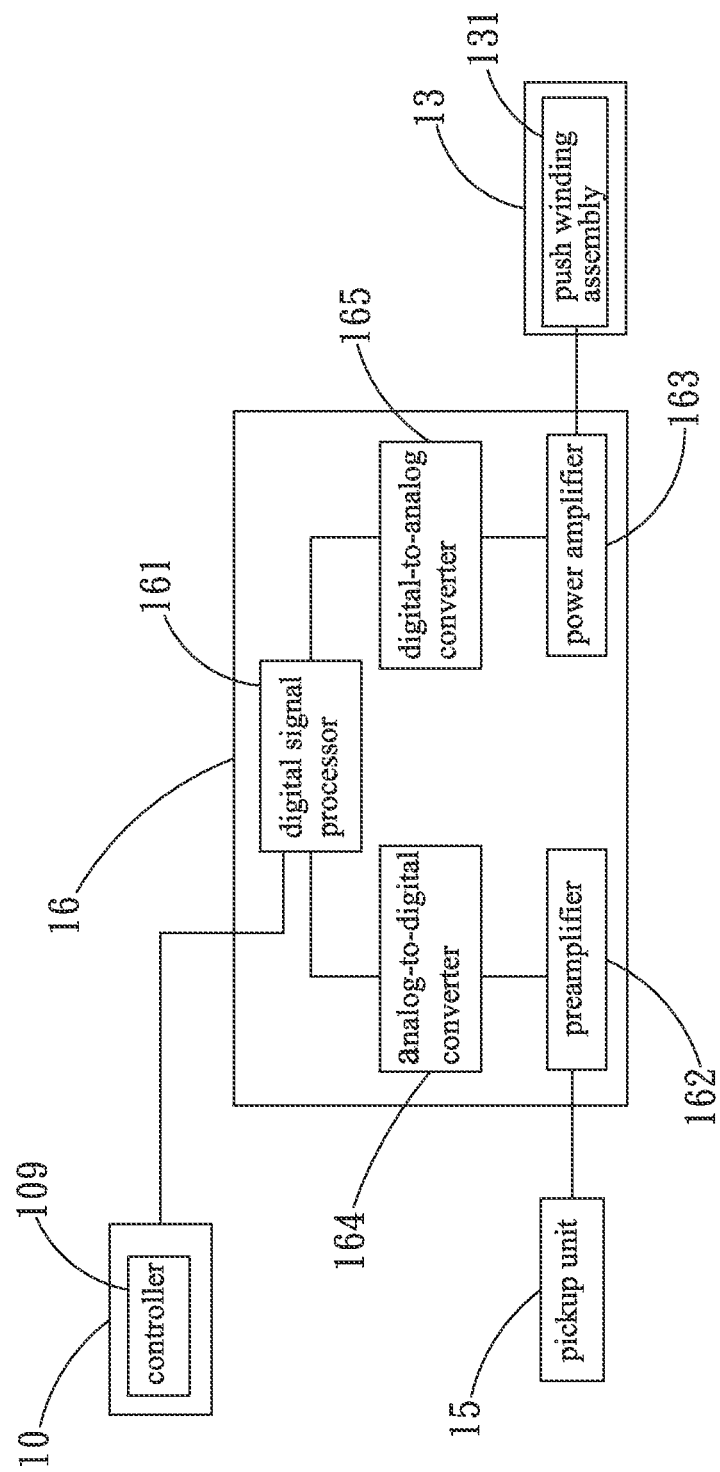
FIG. 5 is a block diagram of a second embodiment of the present invention.

Please now refer to FIG. 5, which is a block diagram of a second embodiment of the present invention. Also referring to FIGS. 2 and 4A, the second embodiment is substantially identical to the first embodiment in structure, connection relationship and effect and thus will not be repeatedly described hereinafter. The second embodiment is different from the first embodiment in that the controller 109 of the fan 10 is electrically connected to the digital signal processor (DSP) 161 of the digital signal processing unit 16 for transmitting a rotational frequency signal to the digital signal processor (DSP) 161. With the phase of the received rotational frequency signal as a reference point, the digital signal processing unit 16 adjusts the phase of the noise input signal and calculates to output another control signal for controlling the push winding assembly 131 to operate.

The rotational frequency signal or so-called frequency generator (FG) signal is a signal indicating the rotational speed of the fan. In fact, the frequency of the noise made by the fan 10 is equal to (or synchronous with) the frequency of the rotational frequency signal. Moreover, there is a distance between the pickup unit 15 and the blades 1032 so that the pickup unit 15 will receive the noise made by the fan 10 with delay. Accordingly, the rotational frequency signal is transmitted to the digital signal processor (DSP) 161 of the digital signal processing unit 16 as a reference point, whereby according to the reference point, the digital signal processor (DSP) 161 will properly delay the phase of the received digital signal and calculate to output another reverse digital signal with a phase 180-degree different from the phase of the sonic wave of the noise. For example, with the phase of the received rotational frequency signal as a reference point, the digital signal processor (DSP) 161 will adjust the phase difference between the actually received digital signal (the noise input signal) and the noise to 175-degree to (nearly) 180-degree delay and calculates to output another reverse digital signal with a phase (nearly) 180-degree different from the phase of the sonic wave of the noise.

Therefore, when the fan 10 operates to make noise, the pickup unit 15 on the frame body 101 readily captures the noise made by the fan impeller 103 to generate the noise input signal and transmit the noise input signal to the preamplifier 162. The preamplifier 162 amplifies the received noise input signal and then outputs the amplified noise input signal to the analog-to-digital converter (ADC) 164. The analog-to-digital converter (ADC) 164 converts the amplified noise input signal into the digital signal. At this time, the digital signal processor (DSP) 161 receives the rotational frequency signal and the digital signal at the same time. With the phase of the received rotational frequency signal as a reference point, the digital signal processor (DSP) 161 will adjust the phase delay of the received digital signal (the amplified digital noise input signal) and calculates to output another reverse digital signal to the digital-to-analog converter (DAC) 165. The digital-to-analog converter (DAC) 165 converts the other reverse digital signal into another reverse analog signal. The power amplifier 163 amplifies the power of the other received reverse analog signal to output another control signal to the push winding assembly 131 for controlling and powering on the push winding assembly 131 to operate and create the magnetic field for inductive magnetization with the magnetic shaft 1031. Accordingly, the magnetic shaft 1031 of the fan impeller 103 in operation will be pushed to axially move up and down within the move space 105 (with reference to FIGS. 4A, 4B and 4C), whereby the fan impeller 103 will make (or emit) a reverse sonic wave with an amplitude equal to that of the noise made by the fan 10. However, the phase of the reverse sonic wave is reverse to the phase of the noise so that the reverse sonic wave can effectively interfere with or offset the noise made by the fan 10 in operation.

In addition, in the case that the noise made by the fan 10 in operation is eliminated, the pickup unit 15 will barely receive the noise input signal. Under such circumstance, the digital signal received by the digital signal processor (DSP) 161 will be very weak. In this case, the received rotational frequency signal will become the main reference signal to be processed for outputting another reverse signal with a frequency equal to that of the noise so as to keep the noise-offsetting effect.

According to the above, the controller 109 of the present invention transmits the rotational frequency signal to the digital signal processor (DSP) 161 as a reference point, whereby according to the reference point, the digital signal processor (DSP) 161 can properly delay the phase of the digital signal so as to precisely interfere with or offset the noise made by the fan 10 in operation.

Figure 6:
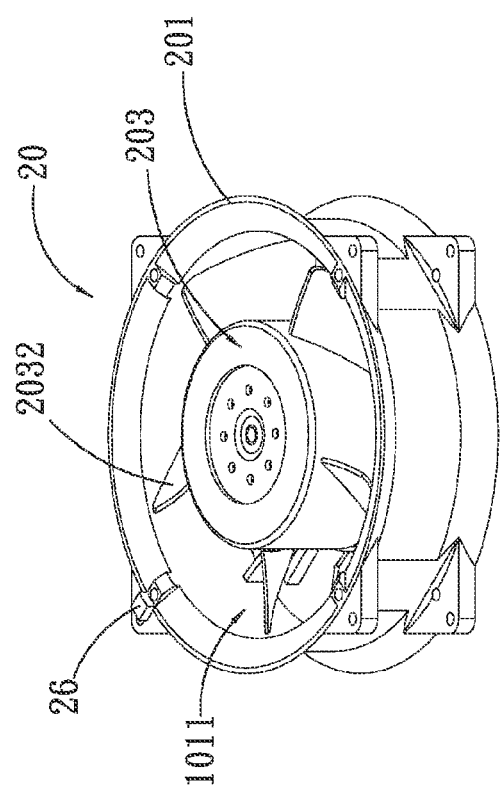
FIG. 6 is a perspective assembled view of a third embodiment of the present invention.
Figure 7:
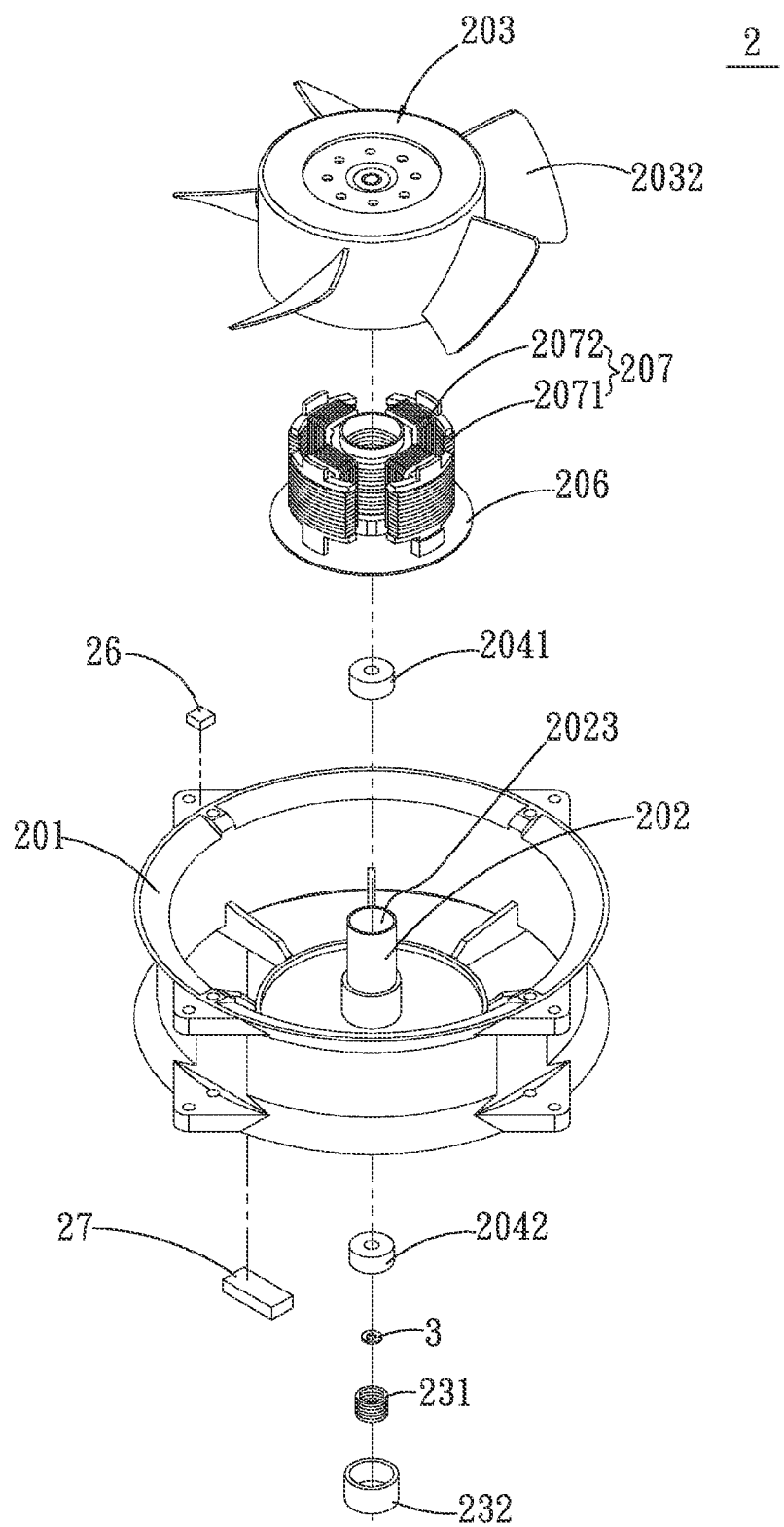
FIG. 7 is a perspective exploded view of the third embodiment of the present invention.
Figure 8:
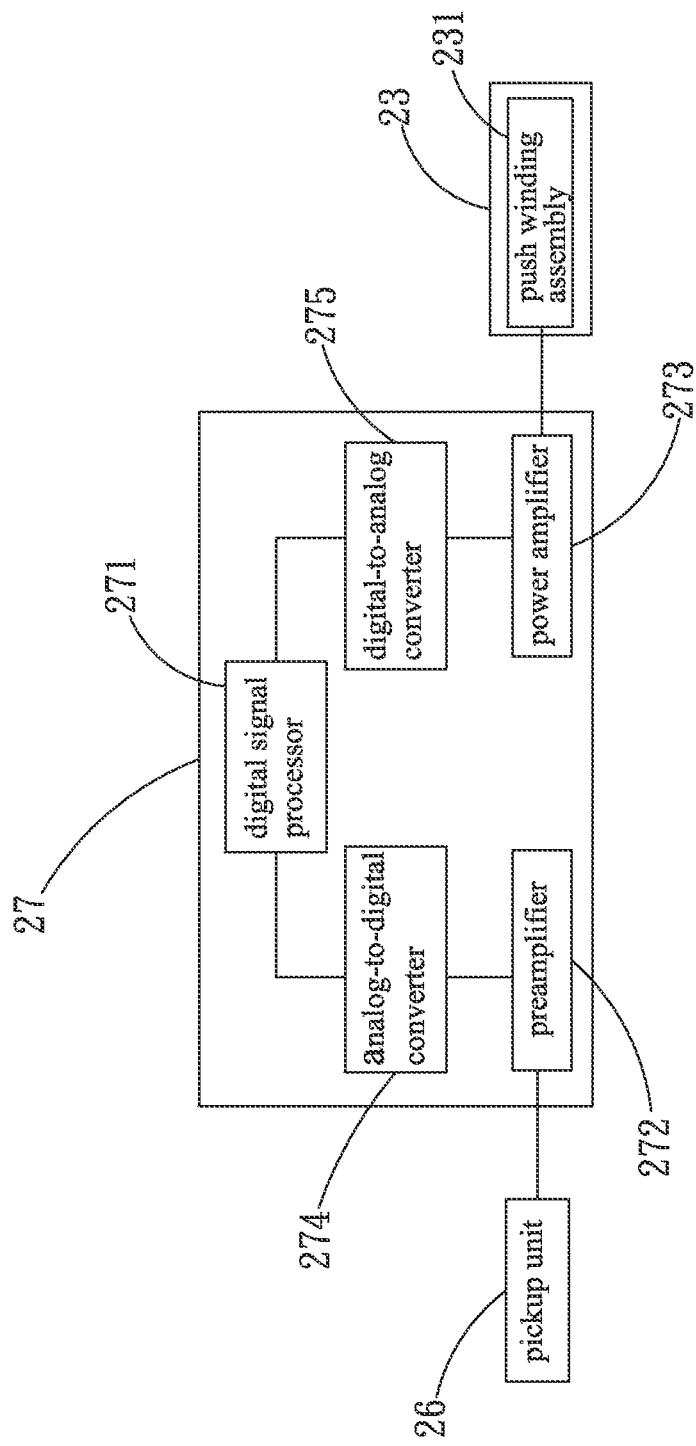
FIG. 8 is a block diagram of the third embodiment of the present invention.
Figure 9A:
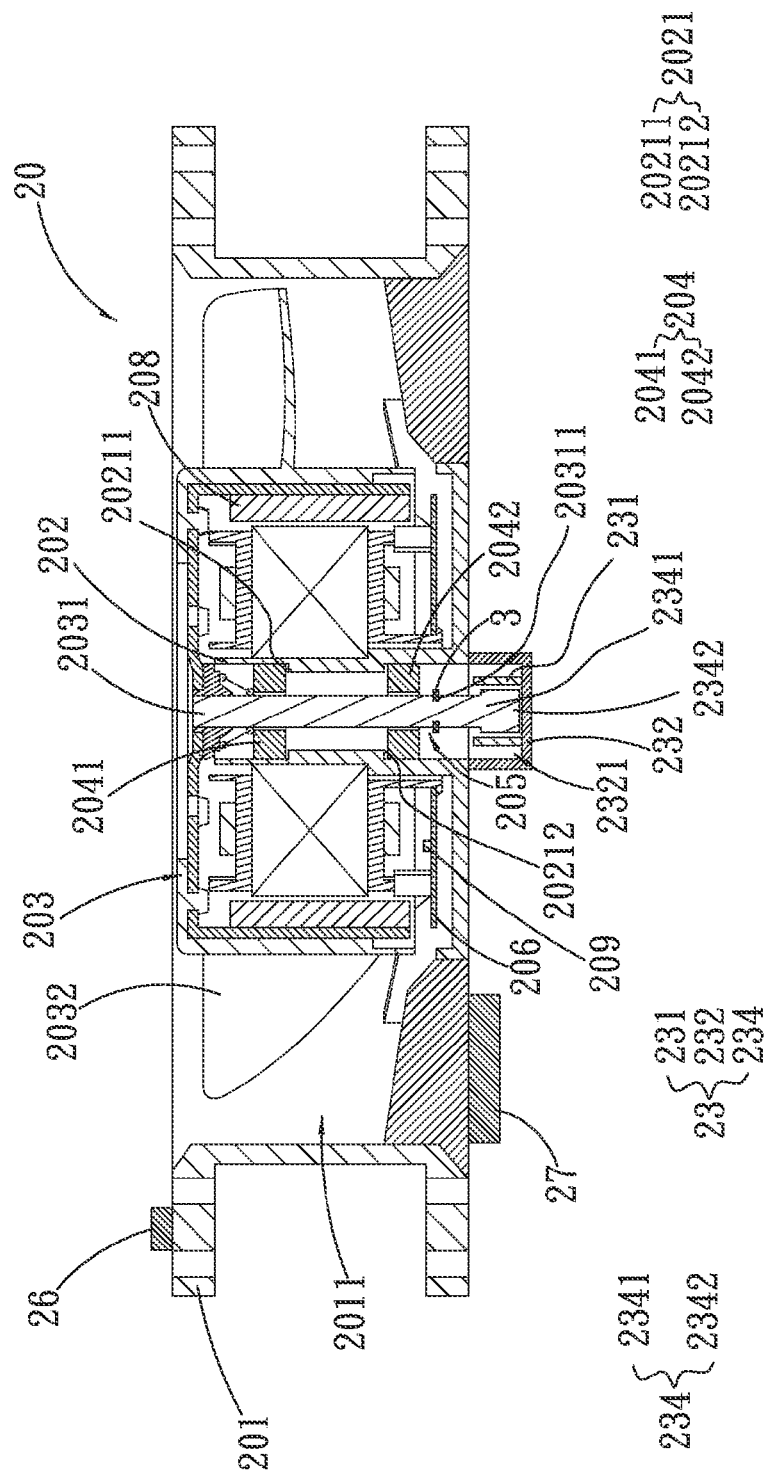
FIG. 9A is a sectional assembled view of the third embodiment of the present invention.

Please now refer to FIGS. 6, 7 and 8 as well as FIG. 9A. FIG. 6 is a perspective assembled view of a third embodiment of the present invention. FIG. 7 is a perspective exploded view of the third embodiment of the present invention. FIG. 8 is a block diagram of the third embodiment of the present invention. FIG. 9A is a sectional assembled view of the third embodiment of the present invention. The third embodiment of the fan active noise self-lowering system 2 of the present invention includes a fan 20, a push assembly 23, at least one pickup unit 26 and a digital signal processing unit 27. The fan 10 includes a frame body 201, a bearing cup 202, a fan impeller 203, a stator 207 and a controller 209. The controller 209 such as a microcontroller (MCU) is disposed on a circuit board 206 positioned on one side of the bearing cup 102 in adjacency to the fan impeller 203 for controlling the rotational speed and operation of the fan. The stator 207 is fitted around the bearing cup 202 corresponding to a magnet 208 disposed in the fan impeller 203. The stator 207 has a silicon steel sheet assembly 2071 and a winding assembly 2072 wound on the silicon steel sheet assembly 2071.

The fan impeller 203 has a shaft 2031 and multiple blades 2032. One end of the shaft 2031 is affixed to a center of the fan impeller 203. The outer circumference of the other end of the shaft 2031 is formed with a groove 20311 in which a retainer member 3 (such as a C-shaped retainer ring) is secured to hold the shaft 2031. The frame body 201 has a receiving space 2011. The bearing cup 202 is disposed at a center of the receiving space 2011. The bearing cup 202 has a bearing hole 2023 in communication with the receiving space 2011 and a support section 2021. The support section 2021 protrudes from an inner wall face of the bearing cup 202 toward the center of the bearing hole 2023. The support section 2021 has a first platform 20211 and a second platform 20212. The first platform 20211 is formed at a top section of the support section 2021, while the second platform 20212 is formed at a bottom section of the support section 2021.

The bearing hole 2023 passes through the bearing cup 202 from the top section to the bottom section thereof. At least one bearing 204 is disposed in the bearing hole 2023 and rotatably connected with the other end of the magnetic shaft 2031. In this embodiment, there are two bearings 204 for illustration. That is, there are a first bearing 2041 and a second bearing 2042. The first bearing 2041 is positioned on the first platform 20211, while the second bearing 2042 is positioned on the second platform 20212 above the groove 20311 of the shaft 2031. In other words, the groove 20311 is positioned below the second bearing 2042. A move space 205 is defined between the groove 20311 and the second bearing 2042 for the shaft 2031 to axially move up and down.

Figure 9B:
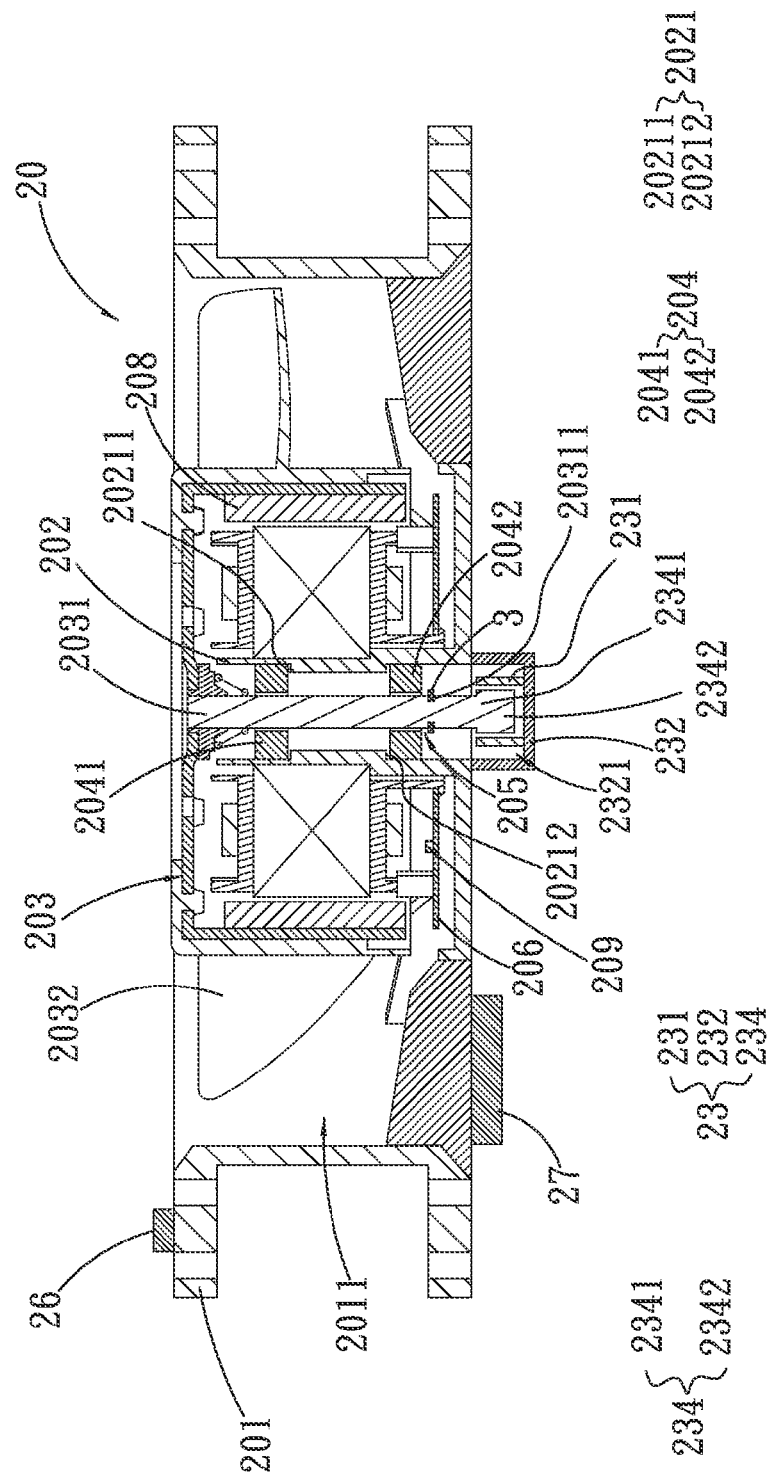
FIG. 9B is another sectional assembled view of the second embodiment of the present invention.
Figure 9C:
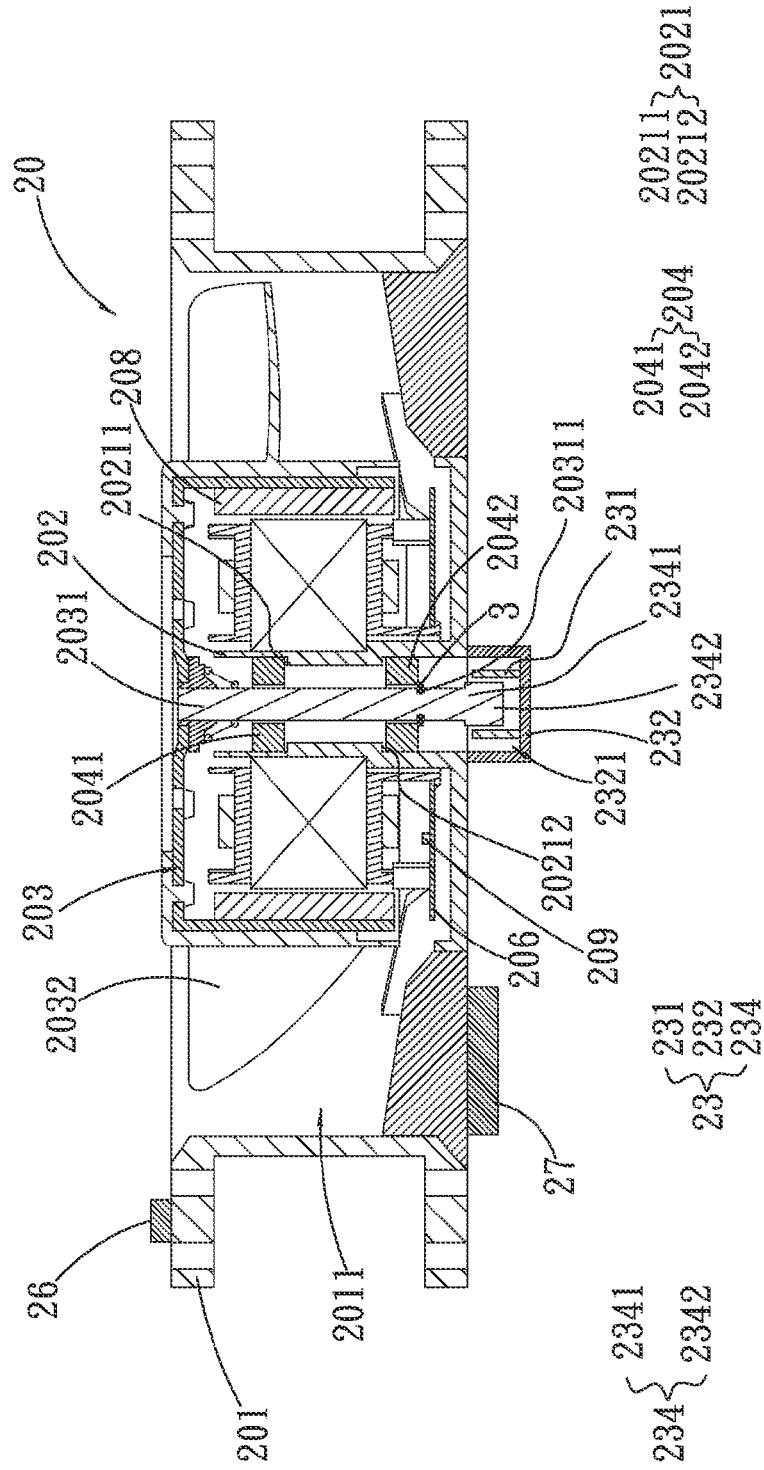
FIG. 9C is still another sectional assembled view of the second embodiment of the present invention.

Please further refer to FIGS. 7, 8 and 9A. The push assembly 23 includes a housing 232, a push winding assembly 231 and a magnetic member 234. The housing 232 is mated with the bottom section of the bearing cup 202 and formed with a receiving space 2321 in communication with the bearing hole 2023. The push winding assembly 231 and the magnetic member 234 are received in the receiving space 2321. The magnetic member 234 is a magnet. One end of the magnetic member 234 is connected to the other end of the shaft 2031 passing through the bottom section of the bearing cup 202. The magnetic member 234 is positioned below the second bearing 2042 for inductive magnetization with the push winding assembly 231. That is, the push winding assembly 231 received in the receiving space 2321 is positioned between the magnetic member 234 and an inner circumference of the housing 232 corresponding to a first magnetic pole 2341 and a second magnetic pole 2342 of the magnetic member 234. When the push winding assembly 231 is powered on, the push winding assembly 231 creates a magnetic field to repel the first and second magnetic poles 2341, 2342, (that is, N pole and S pole) of the magnetic member 234 under magnetic force. Accordingly, the magnetic shaft 2031 in operation will be pushed to axially move up and down within the move space 205 (with reference to FIGS. 9A, 9B and 9C). Therefore, when the fan impeller 203 operates to provide air volume, a reverse sonic wave is also generated. The reverse sonic wave has an amplitude equal to the amplitude of the noise made by the fan 20, but has a phase reverse to the phase of the noise. The reverse sonic wave serves to interfere with or offset the operation noise of the fan impeller 203. In this embodiment, the first magnetic pole 2341 (N pole) of the magnetic member 234 is positioned at one end of the magnetic member 234 in adjacency to the other end of the shaft 2031 corresponding to the second bearing 2042, while the second magnetic pole 2342 (S pole) is positioned at the other end of the magnetic member 234 in adjacency to the inner face of bottom wall of the housing 232. In practice, alternatively, the second magnetic pole 2342 of the magnetic member 234 can be positioned at one end of the magnetic member 234 in adjacency to the other end of the shaft 2031 corresponding to the second bearing 2042, while the first magnetic pole 2341 can be positioned at the other end of the magnetic member 234 in adjacency to the inner face of bottom wall of the housing 232.

According to the above, the fan 20 of the present invention itself is a sound source. When the fan impeller 203 makes noise, the fan 20 itself will immediately generate a reverse sonic wave to effectively interfere with or offset the noise. In this case, the noise of the fan 20 is prevented from reflecting in the environmental space to form a complex noise. Therefore, the amplitude of the noise is previously greatly reduced to restrain the noise from spreading. Under such circumstance, the signal source, (that is, the noise source) received by the digital signal processing unit 27 is relatively simple so that the complication of operation of the digital signal processing unit 27 is lowered. Therefore, the price can be lowered.

The pickup unit 26 is a pickup microphone. The pickup unit 26 serves to capture (or read) the noise made by the fan impeller 203 of the fan 20 in operation. The pickup unit 26 of the third embodiment is identical to that of the first embodiment in structure, connection relationship and effect and thus will not be repeatedly described hereinafter. The digital signal processing unit 27 of the third embodiment includes a digital signal processor (DSP) 271, a preamplifier 272, a power amplifier 273, an analog-to-digital converter (ADC) 274 and a digital-to-analog converter (DAC) 275. These components of the third embodiment are identical to those of the first embodiment in structure, connection relationship and effect and thus will not be repeatedly described hereinafter.

Also, in practice, the cooperation between the digital signal processing unit 27 and the controller 209 such as a microcontroller (MCU) of the third embodiment is identical to that of the first embodiment and thus will not be repeatedly described hereinafter.

When the fan 20 operates to make noise, the pickup unit 26 on the frame body 201 readily captures the noise made by the fan impeller 203 to generate the noise input signal and transmit the noise input signal to the preamplifier 272. The preamplifier 272 amplifies the received noise input signal and then outputs the amplified noise input signal to the analog-to-digital converter (ADC) 274. The analog-to-digital converter (ADC) 274 converts the amplified noise input signal into the digital signal. The digital signal processor (DSP) 271 receives the digital signal and processes the digital signal to output the reverse digital signal to the digital-to-analog converter (DAC) 275. The digital-to-analog converter (DAC) 275 converts the reverse digital signal into the reverse analog signal. The power amplifier 273 amplifies the power of the received reverse analog signal to output the control signal to the push winding assembly 231 for controlling and powering on the push winding assembly 231 to operate and create the magnetic field for inductive magnetization with the magnetic member 234. Accordingly, the shaft 2031 of the fan impeller 203 in operation will be pushed to axially move up and down within the move space 205 (with reference to FIGS. 9A, 9B and 9C), whereby the fan impeller 203 will make or emit a reverse sonic wave with an amplitude equal to that of the noise made by the fan 20. However, the phase of the reverse sonic wave is reverse to the phase of the noise so that the reverse sonic wave can effectively interfere with or offset the noise made by the fan 10 in operation.

Therefore, the digital signal processing unit 27 of the present invention can be properly control the push winding assembly 231 to operate for inductive magnetization with the magnetic member 234 so as to push the shaft 2031 to move up and down. In this case, the fan impeller 203 itself will emit a reverse sonic wave to offset (or interfere with) the noise made by the fan 20. According to such systematic design, a better noise-lowering effect is achieved and the cost is lowered. Moreover, the noise of the fan 20 is prevented from reflecting in the environmental space to form a complex noise.

Figure 10:
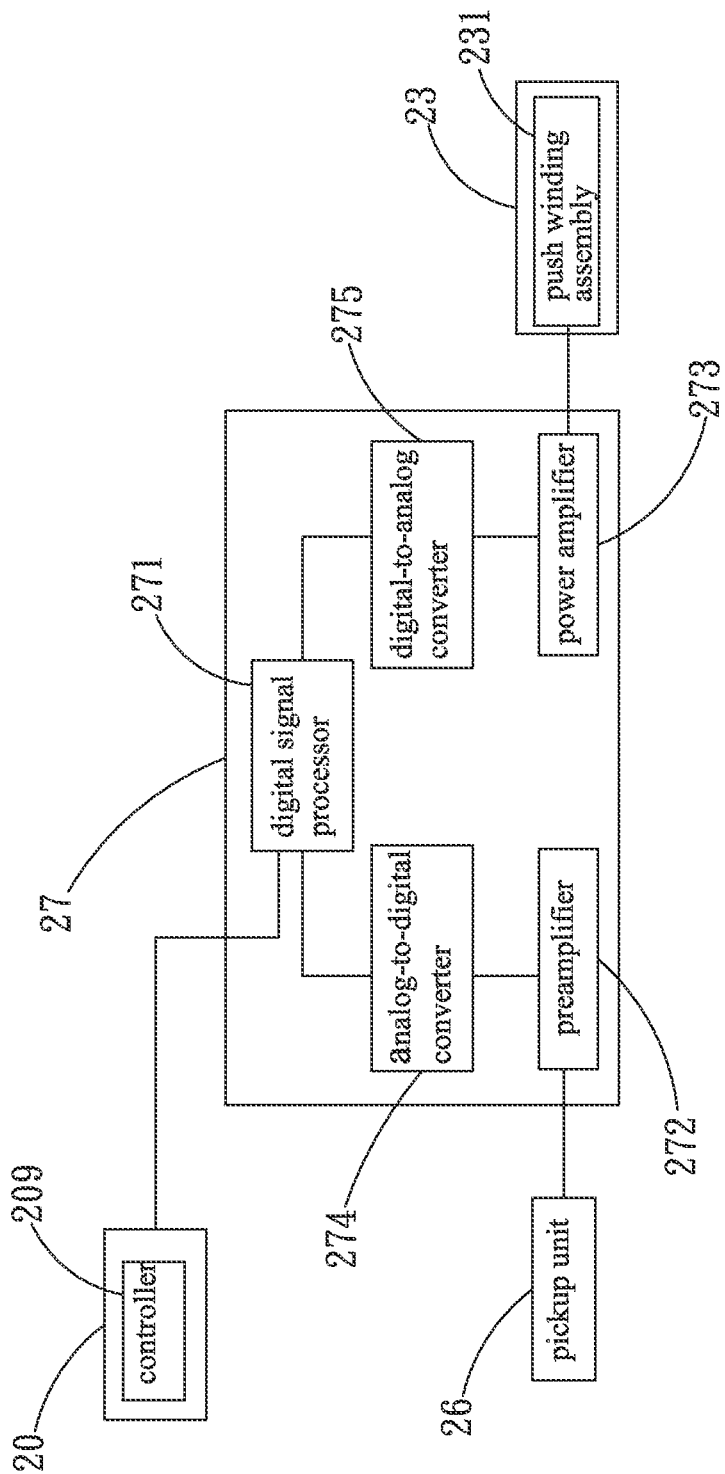
FIG. 10 is a block diagram of a fourth embodiment of the present invention.

Please now refer to FIG. 10, which is a block diagram of a fourth embodiment of the present invention. Also referring to FIGS. 8 and 9A, the fourth embodiment is substantially identical to the third embodiment in structure, connection relationship and effect and thus will not be repeatedly described hereinafter. The fourth embodiment is different from the third embodiment in that the controller 209 of the fan 20 is electrically connected to the digital signal processor (DSP) 271 of the digital signal processing unit 27 for transmitting a rotational frequency signal to the digital signal processor (DSP) 271. With the phase of the received rotational frequency signal as a reference point, the digital signal processing unit 27 adjusts the phase of the noise input signal and calculates to output another control signal for controlling the push winding assembly 231 to operate.

The rotational frequency signal or so-called frequency generator (FG) signal is a signal indicating the rotational speed of the fan. In fact, the frequency of the noise made by the fan 20 is equal to (or synchronous with) the frequency of the rotational frequency signal. Moreover, there is a distance between the pickup unit 26 and the blades 2032 so that the pickup unit 26 will receive the noise made by the fan 20 with delay. Accordingly, the rotational frequency signal is transmitted to the digital signal processor (DSP) 271 of the digital signal processing unit 27 as a reference point, whereby according to the reference point, the digital signal processor (DSP) 271 will properly delay the phase of the received digital signal and calculate to output another reverse digital signal with a phase 180-degree different from the phase of the sonic wave of the noise. For example, with the phase of the received rotational frequency signal as a reference point, the digital signal processor (DSP) 271 will adjust the phase difference between the actually received digital signal (the noise input signal) and the noise to 175-degree to (nearly) 180-degree delay and calculates to output another reverse digital signal with a phase (nearly) 180-degree different from the phase of the sonic wave of the noise.

Therefore, when the fan 20 operates to make noise, the pickup unit 26 on the frame body 201 readily captures the noise made by the fan impeller 203 to generate the noise input signal and transmit the noise input signal to the preamplifier 272. The preamplifier 272 amplifies the received noise input signal and then outputs the amplified noise input signal to the analog-to-digital converter (ADC) 274. The analog-to-digital converter (ADC) 274 converts the amplified noise input signal into the digital signal. At this time, the digital signal processor (DSP) 271 receives the rotational frequency signal and the digital signal at the same time. With the phase of the received rotational frequency signal as a reference point, the digital signal processor (DSP) 271 will adjust the phase delay of the received digital signal (the amplified digital noise input signal) and calculates to output another reverse digital signal to the digital-to-analog converter (DAC) 275. The digital-to-analog converter (DAC) 275 converts the other reverse digital signal into another reverse analog signal. The power amplifier 273 amplifies the power of the other received reverse analog signal to output another control signal to the push winding assembly 231 for controlling and powering on the push winding assembly 231 to operate and create the magnetic field for inductive magnetization with the magnetic member 234. Accordingly, the shaft 2031 of the fan impeller 203 in operation will be pushed to axially move up and down within the move space 205 (with reference to FIGS. 9A, 9B and 9C), whereby the fan impeller 203 will make (or emit) a reverse sonic wave with an amplitude equal to that of the noise made by the fan 20. However, the phase of the reverse sonic wave is reverse to the phase of the noise so that the reverse sonic wave can effectively interfere with or offset the noise made by the fan 20 in operation.

In addition, in the case that the noise made by the fan 20 in operation is eliminated, the pickup unit 26 will barely receive the noise input signal. Under such circumstance, the digital signal received by the digital signal processor (DSP) 271 will be very weak. In this case, the received rotational frequency signal will become the main reference signal to be processed for outputting another reverse signal with a frequency equal to that of the noise so as to keep the noise-offsetting effect.

According to the above, the controller 209 of the present invention transmits the rotational frequency signal to the digital signal processing unit 27 as a reference point, whereby according to the reference point, the digital signal processor (DSP) 271 can properly delay the phase of the digital signal so as to precisely interfere with or offset the noise made by the fan 20 in operation.

In comparison with the conventional device, the present invention has the following advantages:
1. The present invention has better noise-lowering effect.
2. The noise of the fan is prevented from reflecting in the environmental space to form a complex noise. Therefore, the complication of operation of the digital signal processing unit is lowered so that the cost is lowered.
3. The amplitude of the noise is previously greatly reduced to restrain the noise from spreading.

The present invention has been described with the above embodiments thereof and it is understood that many changes and modifications in the above embodiments can be carried out without departing from the scope and the spirit of the invention that is intended to be limited only by the appended claims.

What is claimed is:
1. A fan active noise self-lowering system comprising:
a fan including a frame body, a bearing cup and a fan impeller, the fan impeller having a magnetic shaft and multiple blades, one end of the magnetic shaft being affixed to a center of the fan impeller, the frame body having a receiving space, the bearing cup being disposed at a center of the receiving space, the bearing cup having a bearing hole, at least one bearing being disposed in the bearing hole and rotatably connected with the other end of the magnetic shaft;
a push assembly including a push winding assembly received in the bearing hole in adjacency to the bearing for inductive magnetization with the magnetic shaft so as to push the magnetic shaft to axially move up and down, whereby the fan impeller generates a reverse sonic wave to offset the noise made by the fan;
at least one pickup unit disposed on the frame body, the pickup unit serving to capture the noise made by the fan to generate a noise input signal; and
a digital signal processing unit, one end of the digital signal processing unit being electrically connected to the pickup unit, while the other end of the digital signal processing unit being electrically connected to the push winding assembly, the digital signal processing unit receiving and processing the noise input signal to output a control signal for controlling the push winding assembly to operate.

2. The fan active noise self-lowering system as claimed in claim 1, wherein the digital signal processing unit includes a digital signal processor, a preamplifier, a power amplifier, an analog-to-digital converter and a digital-to-analog converter, the preamplifier being electrically connected to the pickup unit and the analog-to-digital converter, the digital signal processor being electrically connected to the analog-to-digital converter and the digital-to-analog converter, the power amplifier being electrically connected to the digital-to-analog converter and the push winding assembly.

3. The fan active noise self-lowering system as claimed in claim 2, wherein the pickup unit is a pickup microphone, the pickup unit being disposed on a top face of the frame body in adjacency to the fan impeller.

4. The fan active noise self-lowering system as claimed in claim 3, wherein the magnetic shaft has a first magnetic pole and a second magnetic pole, the first magnetic pole being positioned in adjacency to one end of the push winding assembly, while the second magnetic pole being positioned in adjacency to the other end of the push winding assembly.

5. The fan active noise self-lowering system as claimed in claim 4, wherein the bearing cup has a support section protruding from an inner wall face of the bearing cup toward the center of the bearing hole, the support section having a first platform and a second platform, the first platform being formed at a top section of the support section, while the second platform being formed at a bottom section of the support section, the bearings including a first bearing and a second bearing, the first bearing being positioned on the first platform, while the second bearing being positioned on the second platform.

6. The fan active noise self-lowering system as claimed in claim 5, wherein an outer circumference of the other end of the magnetic shaft is formed with a groove positioned below the second bearing, a retainer member being secured in the groove to hold the magnetic shaft, a move space being defined between the groove and the second bearing.

7. The fan active noise self-lowering system as claimed in claim 6, wherein the fan further includes a controller electrically connected to the digital signal processing unit for transmitting a rotational frequency signal to the digital signal processing unit, whereby with the phase of the rotational frequency signal received by the digital signal processing unit as a reference point, the digital signal processing unit adjusts the phase of the noise input signal and calculate to output another control signal for controlling the push winding assembly to operate.

8. The fan active noise self-lowering system as claimed in claim 3, wherein the fan further includes a controller electrically connected to the digital signal processing unit for transmitting a rotational frequency signal to the digital signal processing unit, whereby with the phase of the rotational frequency signal received by the digital signal processing unit as a reference point, the digital signal processing unit adjusts the phase of the noise input signal and calculate to output another control signal for controlling the push winding assembly to operate.

9. A fan active noise self-lowering system comprising:
a fan including a frame body, a bearing cup and a fan impeller, the fan impeller having a shaft and multiple blades, one end of the shaft being affixed to a center of the fan impeller, the frame body having a receiving space, the bearing cup being disposed at a center of the receiving space, the bearing cup having a bearing hole, at least one bearing being disposed in the bearing hole and rotatably connected with the other end of the shaft;
a push assembly including a housing, a push winding assembly and a magnetic member, the housing being mated with a bottom section of the bearing cup and formed with a receiving space in communication with the bearing hole, the push winding assembly and the magnetic member being received in the receiving space, one end of the magnetic member being connected to the other end of the shaft for inductive magnetization with the push winding assembly so as to push the shaft to axially move up and down, whereby the fan impeller generates a reverse sonic wave to offset the noise made by the fan;
at least one pickup unit disposed on the frame body, the pickup unit serving to capture the noise made by the fan to generate a noise input signal; and
a digital signal processing unit, one end of the digital signal processing unit being electrically connected to the pickup unit, while the other end of the digital signal processing unit being electrically connected to the push winding assembly, the digital signal processing unit receiving and processing the noise input signal to output a control signal for controlling the push winding assembly to operate.

10. The fan active noise self-lowering system as claimed in claim 9, wherein the digital signal processing unit includes a digital signal processor, a preamplifier, a power amplifier, an analog-to-digital converter and a digital-to-analog converter, the preamplifier being electrically connected to the pickup unit and the analog-to-digital converter, the digital signal processor being electrically connected to the analog-to-digital converter and the digital-to-analog converter, the power amplifier being electrically connected to the digital-to-analog converter and the push winding assembly.

11. The fan active noise self-lowering system as claimed in claim 10, wherein the pickup unit is a pickup microphone, the pickup unit being disposed on a top face of the frame body in adjacency to the fan impeller.

12. The fan active noise self-lowering system as claimed in claim 11, wherein the fan further includes a controller electrically connected to the digital signal processing unit for transmitting a rotational frequency signal to the digital signal processing unit, whereby with the phase of the rotational frequency signal received by the digital signal processing unit as a reference point, the digital signal processing unit adjusts the phase of the noise input signal and calculate to output another control signal for controlling the push winding assembly to operate.

13. The fan active noise self-lowering system as claimed in claim 9, wherein the magnetic member is a magnet, the magnetic member having a first magnetic pole and a second magnetic pole, the first magnetic pole being positioned at one end of the magnetic member in adjacency to the other end of the shaft, while the second magnetic pole being positioned at the other end of the magnetic member in adjacency to an inner face of bottom wall of the housing.

14. The fan active noise self-lowering system as claimed in claim 9, wherein the bearing cup has a support section protruding from an inner wall face of the bearing cup toward the center of the bearing hole, the support section having a first platform and a second platform, the first platform being formed at a top section of the support section, while the second platform being formed at a bottom section of the support section, the bearings including a first bearing and a second bearing, the first bearing being positioned on the first platform, while the second bearing being positioned on the second platform.

15. The fan active noise self-lowering system as claimed in claim 14, wherein an outer circumference of the other end of the shaft is formed with a groove positioned below the second bearing, a retainer member being secured in the groove to hold the shaft, a move space being defined between the groove and the second bearing.

16. The fan active noise self-lowering system as claimed in claim 15, wherein the fan further includes a controller electrically connected to the digital signal processing unit for transmitting a rotational frequency signal to the digital signal processing unit, whereby with the phase of the rotational frequency signal received by the digital signal processing unit as a reference point, the digital signal processing unit adjusts the phase of the noise input signal and calculate to output another control signal for controlling the push winding assembly to operate.

* * * * *